US012036644B2

(12) United States Patent
Shi et al.

(10) Patent No.: US 12,036,644 B2
(45) Date of Patent: Jul. 16, 2024

(54) BOLT EXTRACTOR WITH DISTAL END ENGAGEMENT AREAS

(71) Applicant: APEX Brands, Inc., Apex, NC (US)

(72) Inventors: Minglin Shi, Shanghai (CN); Jianguo Ji, Shanghai (CN); Liansheng Zhu, Hangzhou (CN)

(73) Assignee: APEX BRANDS, INC., Apex, NC (US)

( * ) Notice: Subject to any disclaimer, the term of this patent is extended or adjusted under 35 U.S.C. 154(b) by 0 days.

(21) Appl. No.: 18/272,406

(22) PCT Filed: Feb. 8, 2021

(86) PCT No.: PCT/CN2021/076030
§ 371 (c)(1),
(2) Date: Jul. 14, 2023

(87) PCT Pub. No.: WO2022/165841
PCT Pub. Date: Aug. 11, 2022

(65) Prior Publication Data
US 2023/0390905 A1 Dec. 7, 2023

(51) Int. Cl.
*B25B 27/18* (2006.01)

(52) U.S. Cl.
CPC .................................... *B25B 27/18* (2013.01)

(58) Field of Classification Search
CPC ..... B25B 15/00; B25B 15/004; B25B 15/005; B25B 15/007; B25B 23/00; B25B 27/00; B25B 27/0007; B25B 27/02; B25B 27/14; B25B 27/18; F16B 23/00; F16B 23/0023; F16B 23/003; F16B 23/0053; F16B 25/00
See application file for complete search history.

(56) References Cited

U.S. PATENT DOCUMENTS

| | | | |
|---|---|---|---|
| 6,098,499 | A | 8/2000 | Pool |
| 6,176,161 | B1 | 1/2001 | Huang et al. |
| 6,761,089 | B2 | 7/2004 | Bergamo |

(Continued)

FOREIGN PATENT DOCUMENTS

| | | |
|---|---|---|
| CN | 1951637 | 4/2007 |
| CN | 203245822 | 10/2013 |
| WO | 2019008865 | 1/2019 |

OTHER PUBLICATIONS

International Search Report and Written Opinion of International Application No. PCT/CN2021/076030 mailed Nov. 5, 2021.

*Primary Examiner* — Robert J Scruggs
(74) *Attorney, Agent, or Firm* — BURR & FORMAN LLP

(57) ABSTRACT

A threaded fastener extractor (110 or 510) includes a drive end configured to interface with a powered driver where the drive end has a shaft, and an engagement end coupled to the drive end coaxial with the drive end about an axis. The engagement end is configured to engage with an extraction hole (330) formed in a threaded fastener (300). The engagement end includes side cutting edges (140 or 530) disposed on lateral sides of the engagement end and end cutting edges (150 or 540) disposed at a distal end of the engagement end. The side cutting edges (140 or 530) and the end cutting edges (150 or 540) each provides engagement areas for torque transfer between the extractor (110 or 510) and the threaded fastener (300).

20 Claims, 7 Drawing Sheets

(56) References Cited

U.S. PATENT DOCUMENTS

| | | | | |
|---|---|---|---|---|
| 6,868,572 | B1 * | 3/2005 | Newton | B23B 51/10<br>76/82 |
| 7,814,815 | B2 * | 10/2010 | Chen | B25B 15/005<br>81/53.2 |
| D668,697 | S | 10/2012 | Hsu | |
| 8,448,547 | B2 | 5/2013 | Whitehead | |
| D726,521 | S | 4/2015 | Moss | |
| D752,408 | S | 3/2016 | Moss | |
| D774,868 | S | 12/2016 | Ouyang | |
| 10,730,124 | B2 | 8/2020 | Nakajima | |
| 10,731,692 | B2 * | 8/2020 | Goss | B21K 1/463 |
| D935,298 | S | 11/2021 | Liu | |
| D939,309 | S | 12/2021 | Liu | |
| 2006/0019137 | A1 | 8/2006 | McCalley | |
| 2011/0025292 | A1 | 10/2011 | Whitehead | |
| 2014/0021621 | A1 | 8/2014 | Lin | |
| 2016/0082579 | A1 | 3/2016 | Chen et al. | |
| 2016/0033228 | A1 | 11/2016 | Chen | |
| 2018/0000145 | A1 | 1/2018 | Anderson | |
| 2022/0002401 | A1 | 1/2022 | Kashima | |

* cited by examiner

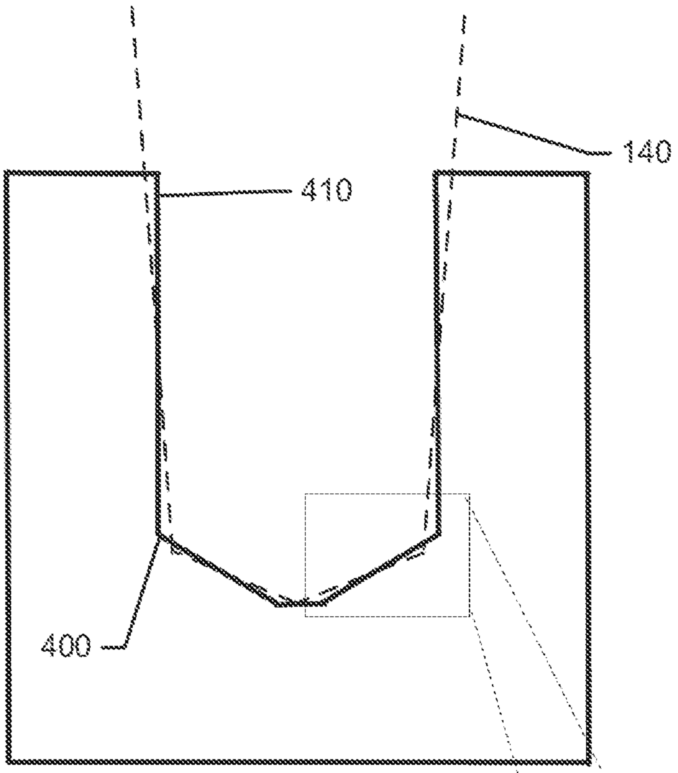
FIG. 4C
FIG. 4D
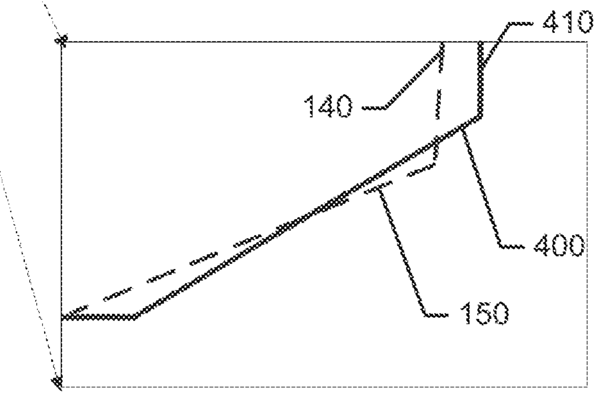
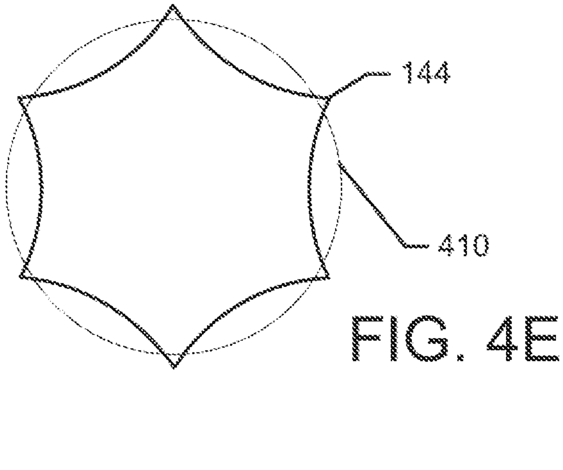
FIG. 4E

FIG. 6A
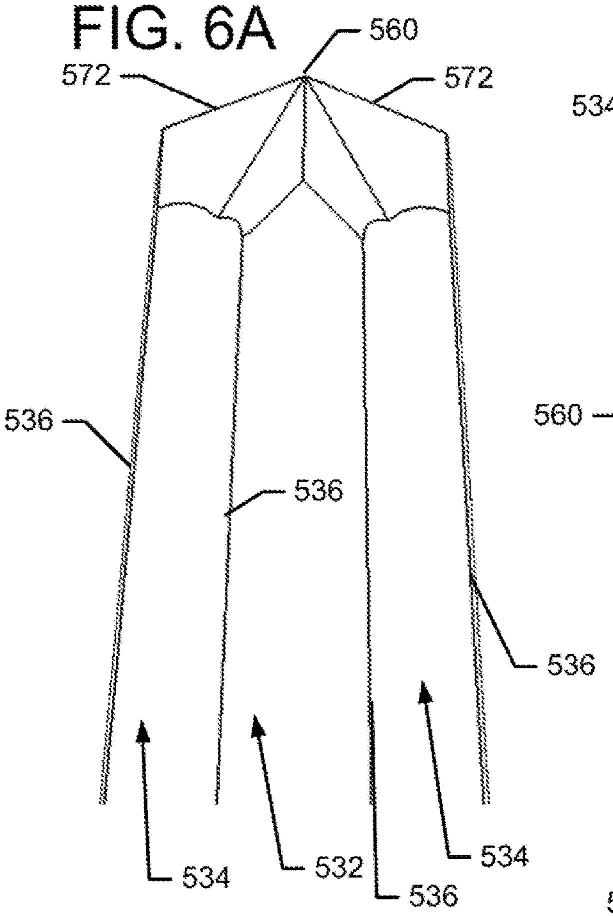
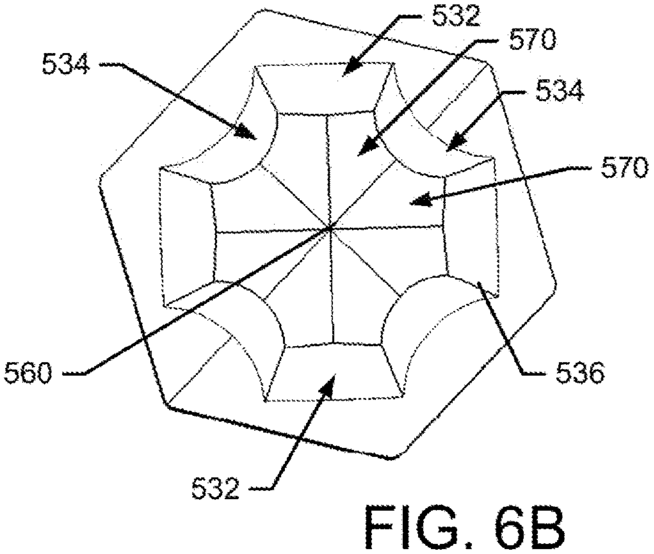
FIG. 6B
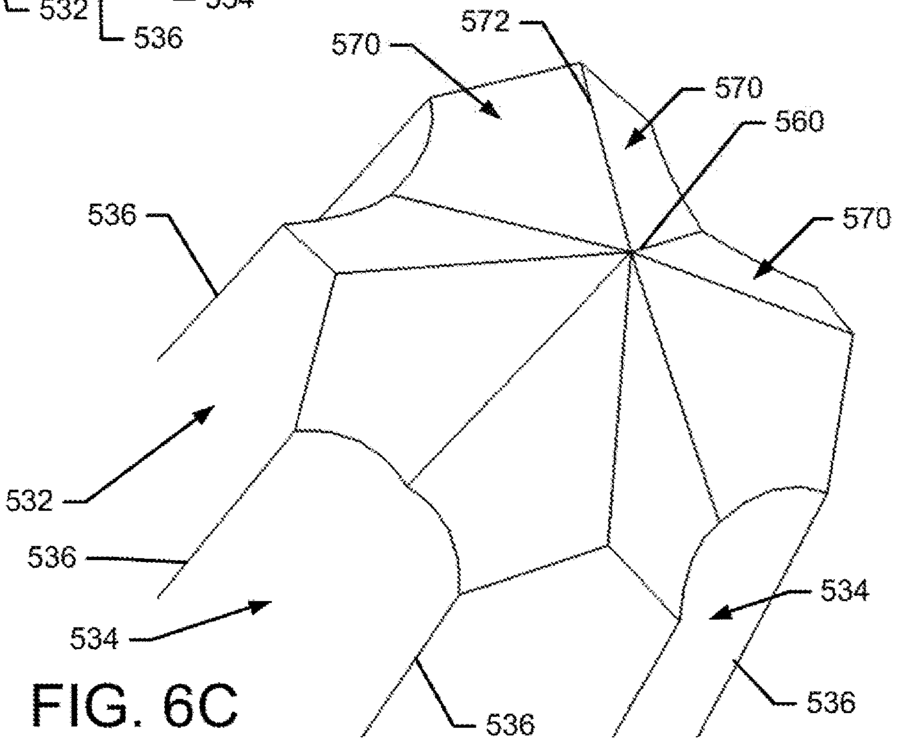
FIG. 6C

BOLT EXTRACTOR WITH DISTAL END ENGAGEMENT AREAS

TECHNICAL FIELD

Example embodiments generally relate to bolt extractor devices, and more particularly to bolt extractor devices that include engagement areas formed on a distal end thereof to engage the bottom of a drill hole formed for removing a bolt or other threaded fastener.

BACKGROUND

Bolts, screws and other threaded fasteners are often used to join components or materials together. The threaded fasteners may have different heads including those having a head that is configured to be engaged by a socket or other device about peripheral edges of the head, or the head may have an aperture formed therein for receiving a driving device in the aperture.

Edges of the aperture or the peripheral edges of the head may become damaged or stripped in some cases. The reasons for such damage or stripping can vary from over-tightening to using the wrong size of driving device, among others. Regardless of the cause, when the head becomes stripped, extraction of the threaded fastener may become very difficult. In this regard, further attempts at removal will typically only worsen the damage to the head.

One method for extraction of threaded fasteners that are damaged has been to drill a hole along the axis of the threaded fastener, and then insert a bolt extractor into the hole. The bolt extractor typically has fluted edges along is lateral sides, and the fluted edges engage the sides of the hole that was drilled. In some cases, a hammer may be used to drive the fluted edges into engagement with internal peripheral sides of the hole. The bolt extractor may then hopefully be turned to remove the threaded fastener.

BRIEF SUMMARY OF SOME EXAMPLES

Some example embodiments may enable the provision of an improved bolt extractor that provides enhanced engagement with threaded fasteners that have been damaged, and that further enhance the ability to start a drill hole for use of the bolt extractor. Thus, performance may be improved, and overall utility may also be enhanced.

In an example embodiment, a threaded fastener extractor is provided. The threaded fastener extractor may include a drive end configured to interface with a powered driver where the drive end has a shaft, and an engagement end operably coupled to the drive end coaxial with the drive end about an axis. The engagement end may be configured to engage an extraction hole formed in a threaded fastener. The engagement end may include a first set of engagement areas for torque transfer between the extractor and the extraction hole at a first radial distance from the axis and at a first axial location along the engagement end. The engagement end may also include a second set of engagement areas for torque transfer between the extractor the threaded fastener at a second radial distance from the axis and at a second axial location along the engagement end. The second radial distance may be less than the first radial distance and the second axial location may be closer to a distal end of the extractor than the first axial location.

In another example embodiment, a threaded fastener extractor may be provided. The threaded fastener extractor may include a drive end configured to interface with a powered driver where the drive end has a shaft, and an engagement end operably coupled to the drive end coaxial with the drive end about an axis. The engagement end may be configured to engage an extraction hole formed in a threaded fastener. The engagement end may include side cutting edges disposed on lateral sides of the engagement end and end cutting edges disposed at a distal end of the engagement end. The side cutting edges and the end cutting edges each providing engagement areas for torque transfer between the extractor and the threaded fastener.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIG. 4C is a cross section view of the engagement end of the bolt extractor having been inserted into the extraction hole according to an example embodiment;

FIG. 4D shows a portion of the view shown in FIG. 4C in greater detail according to an example embodiment;

FIG. 4E illustrates a partial cross section view taken along a line substantially perpendicular to the axis at an area where engagement surfaces of the side cutting edges are penetrated into the sidewalls of the extraction hole according to an example embodiment;

FIG. 6A is a side view of an engagement end of a bolt extractor according to an example embodiment;

FIG. 6B is a top view of the engagement end of the bolt extractor according to an example embodiment;

FIG. 6C is a perspective view of the engagement end of the bolt extractor according to an example embodiment.

DETAILED DESCRIPTION

Figure 1:
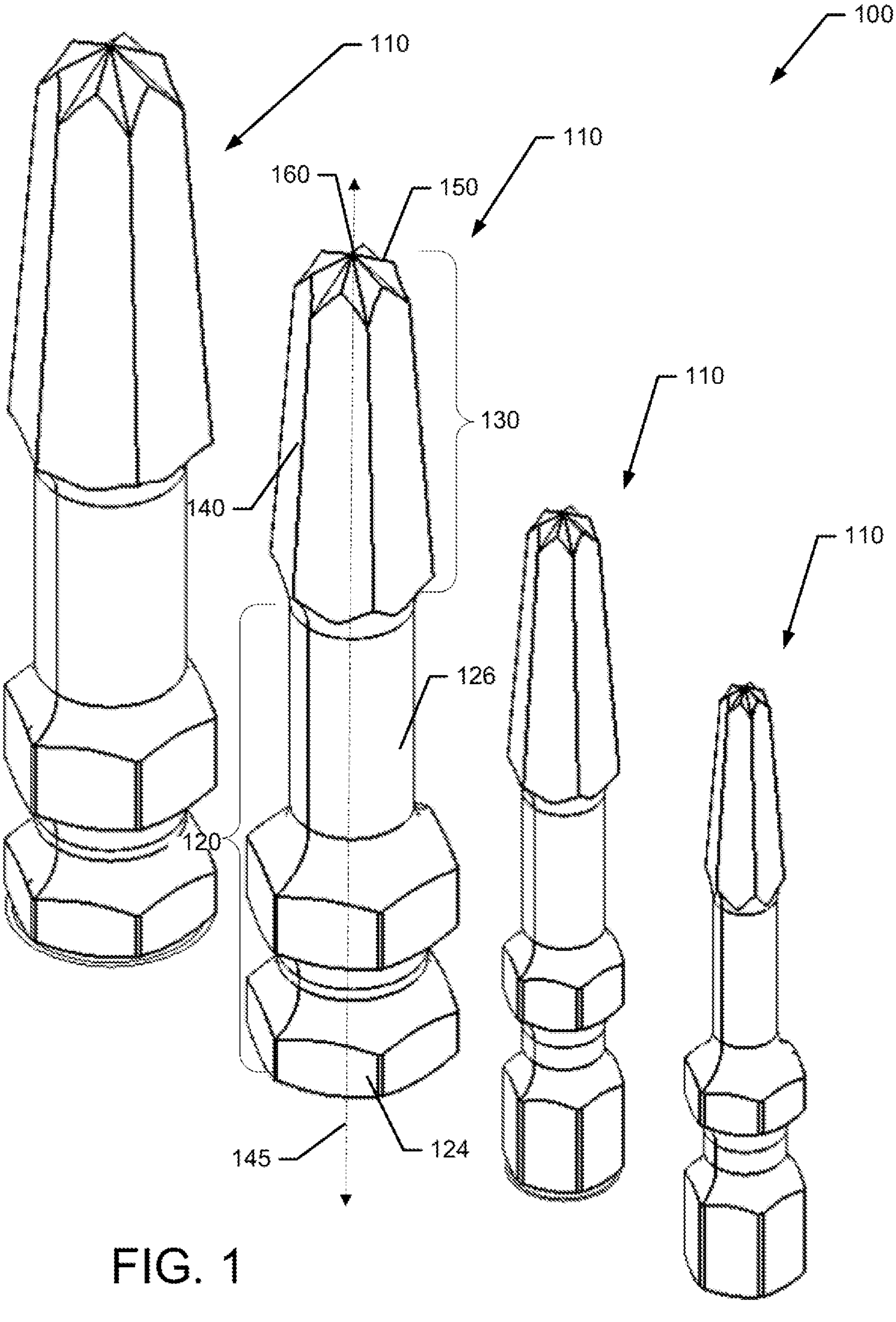
FIG. 1 illustrates a perspective view of a set of bolt extractors according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may relate to the provision of an improved bolt extractor. In this regard, a threaded fastener removal device (e.g., bolt extractor) of an example embodiment may include side cutting edges in combination with end cutting edges. The end cutting edges may be engagement areas located at a distal end of the bolt extractor to engage the bottom of the drill hole formed in the threaded fastener. Moreover, the end cutting edges may be tapered to form a tip, which can be used as a punch to define a start point for drilling the drill hole in the threaded fastener. In this regard, if the head has a stripped aperture, the aperture itself may be formed along the axis of the threaded fastener, and may form a guide for the drill bit when drilling a hole for enabling use of the bolt extractor. However, if the head is completely broken off, if the head is instead engaged peripherally (and therefore has no axially located aperture), or if the damage is too severe, it may not be possible to define a good starting location for drilling the hole. If the drill bit ends up sliding or biting into the threaded fastener off the axis, extraction may be further complicated or impossible. Thus, example embodiments may facilitate using the tip of the end cutting edges as a punch in order to define the start point for the drill bit on the axis of the threaded fastener.

Example embodiments may therefore not only provide improved working torque for removing the threaded fastener (i.e., due to the additional engagement of the end cutting edges), but may also enhance the ability to effectively drill the hole in the threaded fastener in the first place. Some structures that can employ example embodiments will now be described below by way of example and not limitation.

FIG. 1 illustrates a perspective view of an extractor set 100 according to an example embodiment. The extractor set 100 includes a plurality of extractors 110 having respective different sizes, but otherwise sharing the same structural components. The different sizes may correlate to respective different sizes of fasteners for which each of the extractors 110 may be used. In some cases, for example, a bolt having a hex head of a certain size may have a corresponding one of the extractors 110 associated therewith. Although other relationships are possible, in one example, a bolt having a nominal ¼ inch hexagonal head may have an extractor associated therewith having a diameter of about 3⁄16 inch. A bolt having a nominal 5⁄16 inch hexagonal head may have an extractor associated therewith having a diameter of about ¼ inch. A bolt having a nominal 7⁄16 inch hexagonal head may have an extractor associated therewith having a diameter of about 11⁄32 inch. A bolt having a nominal ⅝ inch hexagonal head may have an extractor associated therewith having a diameter of about 17⁄32 inch. A bolt having a nominal ¾ inch hexagonal head may have an extractor associated therewith having a diameter of about 21⁄32 inch.

Since the extractors 110 all have the same structure, only components of one of the extractors 110 are labeled in FIG. 1 for the sake of clarity. Each of the extractors 110 may have a drive end 120 and an engaging end 130. The drive end 120 may be configured to interface with a powered driving device and the engaging end 130 may be configured to interface with a bolt, screw or other threaded fastener. The drive end 120 may include a drive body, which may include a hex head 124 and shaft 126 that are coaxial with each other.

The engaging end 130 may include side cutting edges 140 that extend along lateral sides of the engaging end 130. The side cutting edges 140 may taper as they extend toward a distal end (relative to the hex head 124) of the extractor 110. In an example embodiment, the tapering may occur at about an 8.5 degree angle (relative to an axis 145 of the extractor 110). However, it should be appreciated that other angles are also possible. In some examples, the tapering of the side cutting edges 140 may be formed within a range of between about 5 degrees and about 12.5 degrees.

The engaging end 130 may also include end cutting edges 150 that are located at the distal end of the extractor 110. The end cutting edges 150 also taper, but at a much larger angle. In this regard, for example, the end cutting edges 150 may taper at about a 135 degree angle relative to the axis 145 of the extractor 110. However, it should be appreciated that other angles are also possible. In some examples, the tapering of the end cutting edges 150 may be formed within a range of between about 120 degrees and about 150 degrees. As shown in FIG. 1, the end cutting edges 150 may taper to a center point 160, which may be formed at an apex of the end cutting edges 150, and also at the axis 145 of the extractor 110.

Figure 2A:
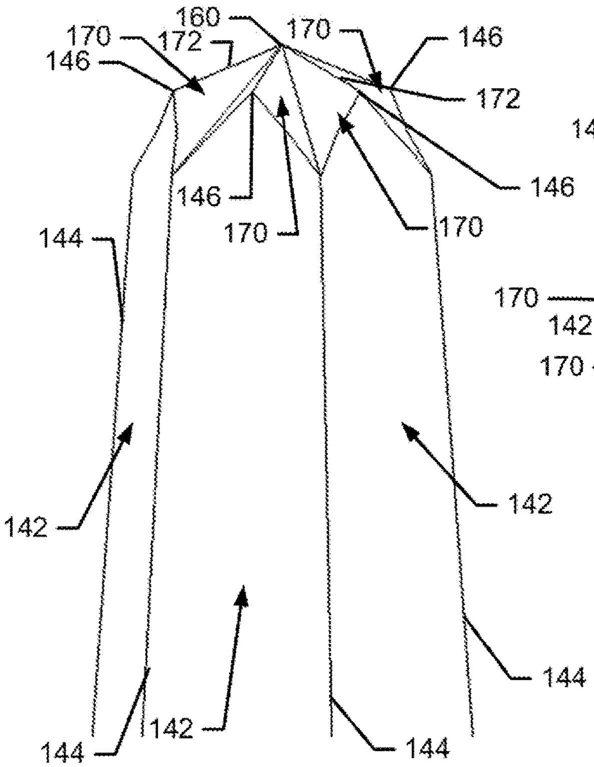
FIG. 2A is a side view of an engagement end of a bolt extractor according to an example embodiment.
Figure 2B:
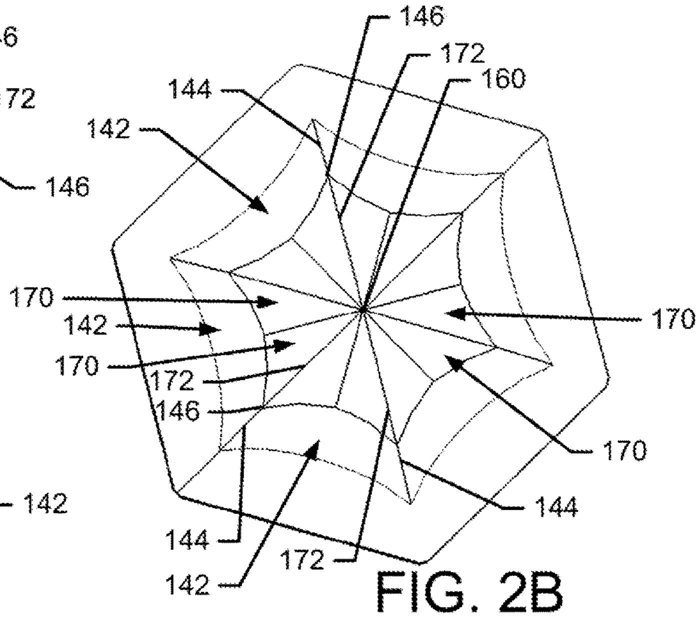
FIG. 2B is a top view of the engagement end of the bolt extractor according to an example embodiment.
Figure 2C:
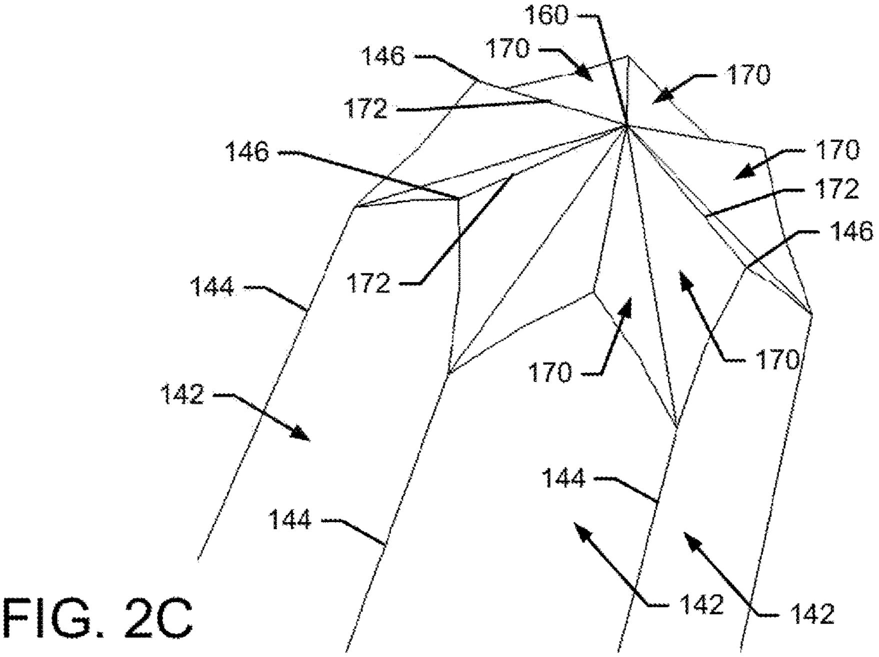
FIG. 2C is a perspective view of the engagement end of the bolt extractor according to an example embodiment.

FIG. 2, which is defined by FIGS. 2A, 2B and 2C, shows closer views of the end cutting edges 150 and side cutting edges 140 of an example embodiment. In this regard, as shown in FIG. 2, the side cutting edges 140 may be fluted along their length. In an example embodiment, the fluting may be formed by concave faces 142 that attach to each other along respective adjacent lateral sides thereof. The point at which the concave faces 142 meet each other forms a side biting ridge 144 that extends the length of the engaging end 130. The example of FIG. 2 is generally hexagonal (i.e., having six concave faces 142). Having six concave faces 142 also means that there are six side biting ridges 144. However, more or fewer faces could be employed in other examples. Additionally, although the side cutting edges 140 of this example are concave in shape instead of planar, one or more planar surfaces could be substituted for the concave faces 142 in some examples. Thus, for example, the concave faces 142 could be replaced with flat (or planar faces), or each concave face 142 could be formed from two planar surfaces that are angled inwardly as they extend away from the side biting ridges 144 (forming a star shape). Other shapes are also possible. That said, the concave faces 142 may increase the sharpness of the angle formed at the side biting ridges 144 to increase the ability of the side biting ridges 144 to penetrate into the hole formed in the fastener.

As shown in FIG. 2, each of the side biting ridges 144 terminates prior to termination of the remainder of the concave faces 142. From the point at which the side biting ridges 144 terminate, the concave faces 142 taper to a point 146. The end cutting edges 150 are then formed between the point at which the side biting ridges 144 terminate and the point 146 of the concave faces 142 and the center point 160. In this regard, end cutting edges 140 are defined by substantially triangular shaped end faces 170. Each of the end faces 170 is bounded by a first edge that extends from the center point 160 to the termination of the side biting ridges 144, a second edge that extends from the center point 160 to the point 146 of the concave faces 142, and a third edge that extends from the point 146 of the concave faces 146 to the termination of the side biting ridges 144. The second edge may be defined as an end biting ridge 172. The end faces 170 are each planar in this example, but other shapes are also possible.

Figure 3A:
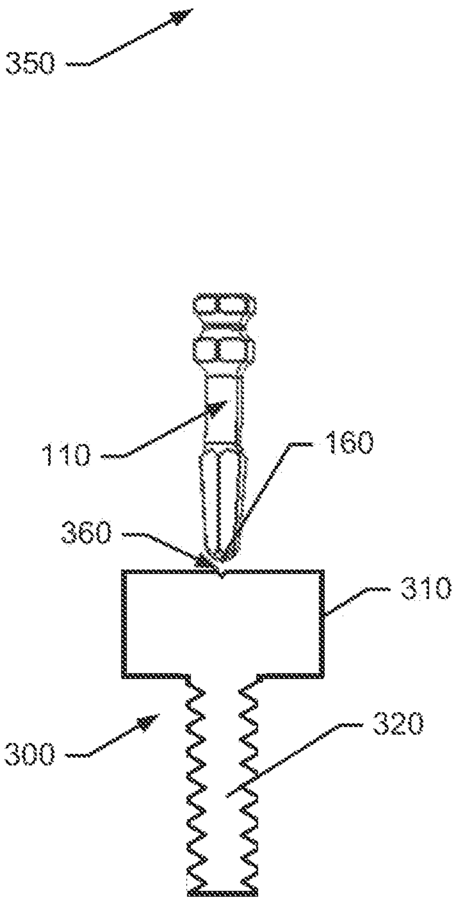
FIG. 3A is a side view of a bolt extractor being used to make a divot or recess in a head of a threaded fastener to facilitate drilling an extraction hole according to an example embodiment.
Figure 3B:
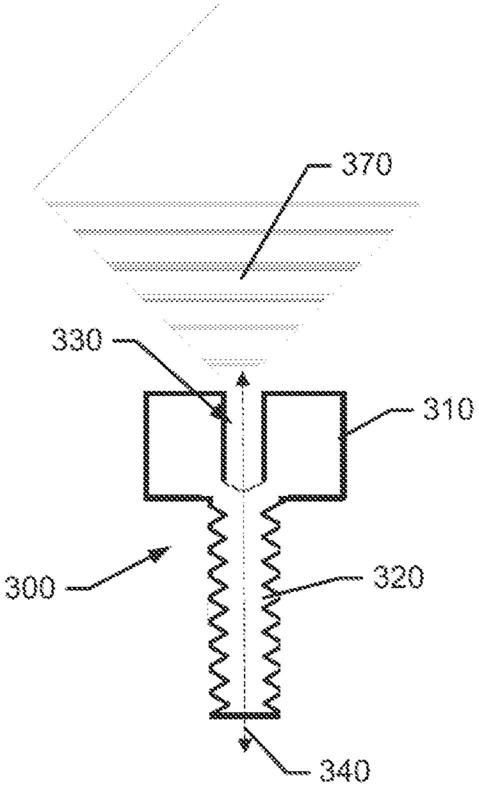
FIG. 3B is a side view showing the threaded fastener in cross section subsequent to drilling the extraction hole according to an example embodiment.
Figure 4A:
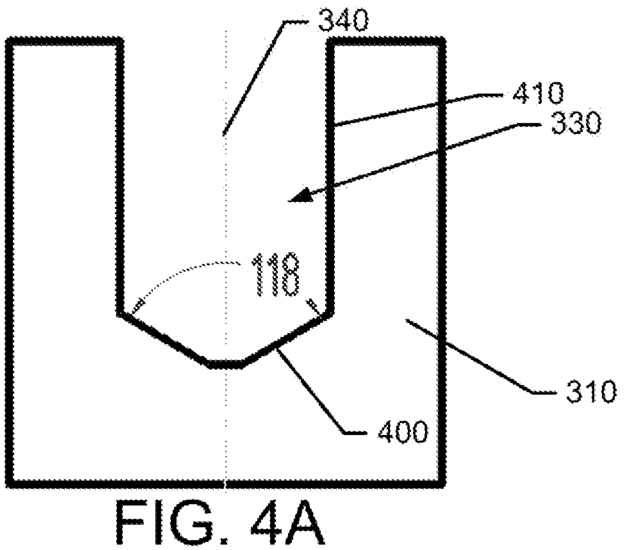
FIG. 4A is a cross section view of the head of the threaded fastener showing the extraction hole in greater detail according to an example embodiment.
Figure 4B:
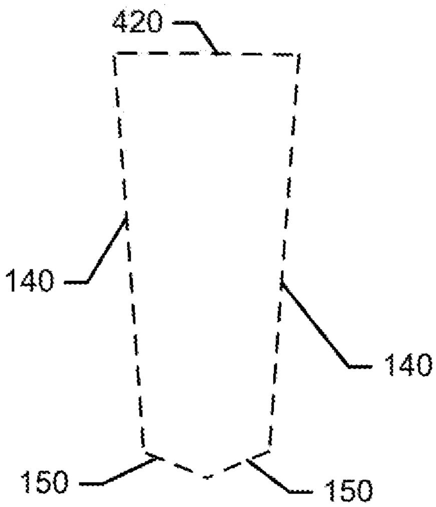
FIG. 4B is a cross section view of an engagement end of the bolt extractor according to an example embodiment.

FIG. 3, which is defined by FIGS. 3A and 3B, shows how a threaded fastener 300 may be prepared for employing one of the extractors 110 of FIGS. 1 and 2 to remove the threaded fastener 300. FIG. 4, which is defined by FIGS. 4A, 4B, 4C, 4D and 4E, then shows specifically how the extractor 110 interacts with the threaded fastener 300. Referring now to FIGS. 3 and 4, the threaded fastener may include a head portion 310, which may presumably be damaged or stripped, and a threaded portion 320, which may be threaded into a medium. The head portion 310 of this example may be a hex head (that is stripped). However, example embodiments may also be practiced with other fasteners having different shaped heads, and can even be practiced by drilling directly into the threaded portion 320 of a fastener having the entire head portion 310 broken off.

As noted above, it may be difficult to ensure that the drilling of an extraction hole 330 is done along an axis 340 of the threaded fastener. To facilitate proper starting of the drilling operation, the extractor 110 may be aligned with a center of the head portion 310 (or threaded portion 320) and the axis 340 before being struck by a hammer 350. The center point 160 may then imprint a divot 360 on a surface of the head portion 310. A drill bit 370 may be set into the divot 360 to align the drill bit 370 along the axis 340, and then the extraction hole 330 may be formed extending along the axis 340 and into the head portion 310 (and/or threaded portion 320).

FIG. 4A shows a cross section view of the head portion 310 to show the extraction hole 330 in greater detail. In this regard, in many cases, the end of the drill bit 370 is tapered, which may cause a tapered bottom wall 400 to form at the distal end or bottom of the sidewalls 410 of the extraction hole 330. In some cases, the tapered bottom wall 400 may have sides that form about a 118 degree angle relative to the axis 340. Meanwhile, FIG. 4B shows a cross section view through a portion of the engaging end 130 of the extractor 110. As such, the cross section view of FIG. 4B shows an outline 420 of the side cutting edges 140 and the end cutting edges 150. The center point 160 is also visible, and remains aligned with the axis 340 while the engaging end 130 is inserted into the extraction hole 330 as shown in FIG. 4C.

Referring now to FIG. 4C, the striking of the extractor 110 by the hammer 350 may cause portions of the side cutting edges 140 (i.e., the side biting ridges 144) and the end cutting edges 150 (i.e., the end biting ridges 172) to penetrate into portions of the sidewalls and bottom of the extraction hole 330. FIG. 4D shows more clearly how portions of the end cutting edges 150 (i.e., the end biting ridges 172) penetrate into portions of the bottom of the extraction hole 330. In this example, the penetration may occur over an area of about 0.2 mm by about 1.7 mm. In this regard, the end cutting edges 150 may penetrate into the bottom of the extraction hole 330 over about 1.7 mm to a depth of about 0.2 mm. The side cutting edges 140 (i.e., the side biting ridges 144) may also penetrate into sidewalls 410 of the extraction hole 330 as shown in FIG. 4E.

Although the penetration of the side cutting edges 140 into the sidewalls 410 of the extraction hole 330 may provide engagement between the extractor 110 and the threaded fastener 300, via which torque may be applied to remove the threaded fastener 300 (regardless of which way the threaded fastener 300 is threaded), the penetration of the end cutting edges 150 into the bottom of the extraction hole (e.g., at the tapered bottom wall 400) provides still more points of engagement, and therefore also more potential torque transfer capability. In this regard, for example, a typical extractor having N number of sides may form N side biting ridges at the intersections of those sides in order to also provide N areas of engagement over which torque transfer may occur. Meanwhile, example embodiments may provide at least N+1 areas of engagement (and in this example structure 2×N areas of engagement) over which torque transfer from the extractor 110 to the threaded fastener 300 may occur for a given N number of sides. The additional areas of engagement enable much more torque to be applied to the threaded fastener 300 than conventional designs, and further enhance the chances of successful extraction.

Additionally, whereas all of the engagement areas initiated by the side cutting edges 140 occur at a first radial distance from the axis 340 and at a first axial location (or depth) along the axis 340, the engagement areas initiated by the end cutting edges 150 occur at a second radial distance from the axis 340, which is less than the first radial distance, and at a second axial location (or depth), which is different (and deeper into the extraction hole 330) than the first axial location. Thus, the extractor 110 transfers torque both at its distal end, and along peripheral sides thereof, which greatly increases the amount and distribution of torque transfer.

Figure 5:
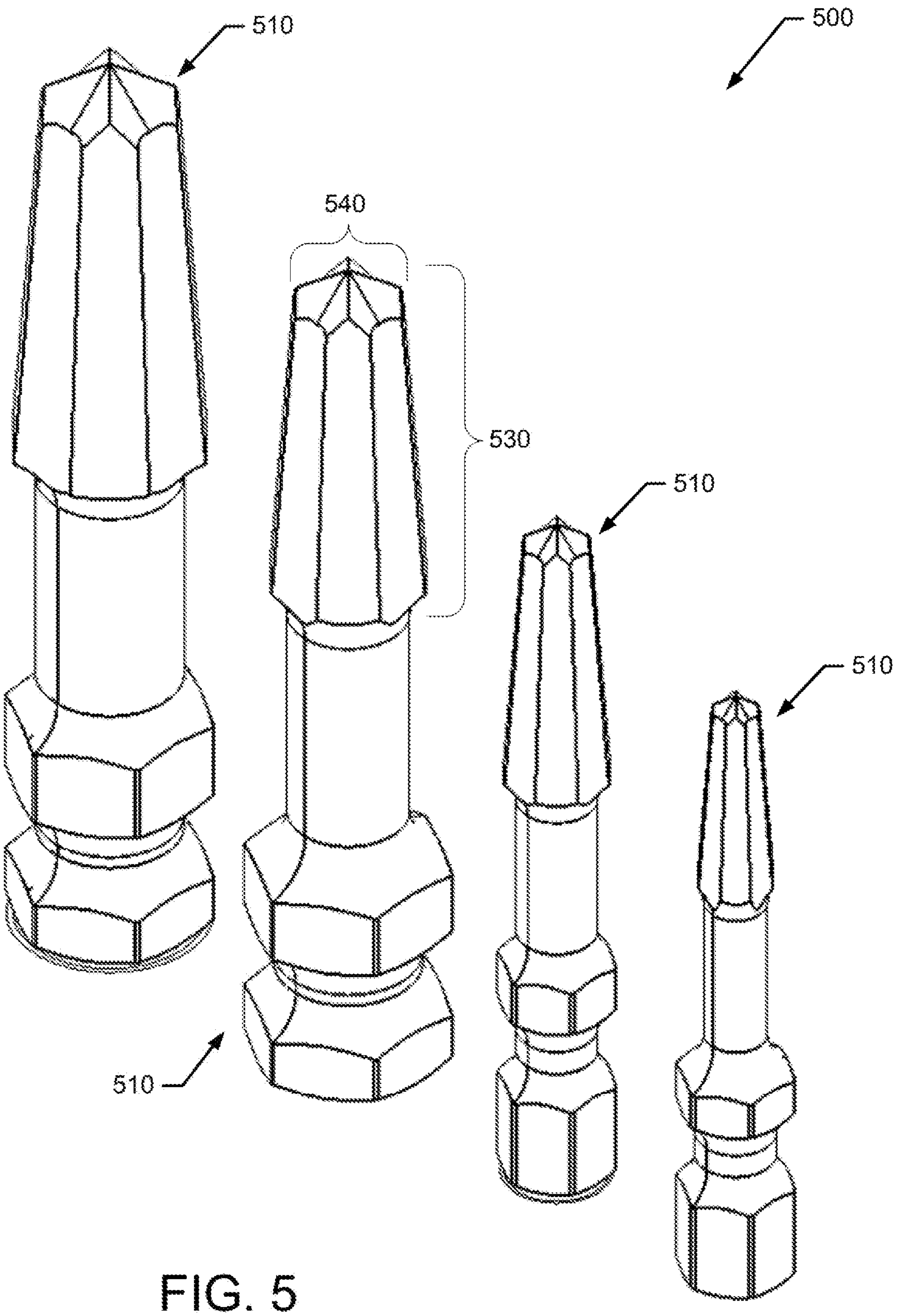
FIG. 5 is a perspective view of a set of bolt extractors with a different design according to an example embodiment.

One of skill in the art may easily appreciate the improved efficacy that may result from the structural improvements described above. However, as noted above, the specific structures may be modified while still achieving the same strategic enhancements. FIG. 5 illustrates a perspective view of an extractor set 500 comprising a plurality of different sized extractors 510 having a slightly different structure for side cutting edges and end cutting edges. FIG. 6, which is defined by FIGS. 6A, 6B and 6C, illustrates more detailed views of the structures of one of the extractors 510. The general components of the extractors 510 of FIG. 5 may be similar to those of the extractors 110 of FIGS. 1-4. However, the side cutting edges 530 of the extractors 510 may be different than the side cutting edges 140 of the extractors 110 of FIGS. 1-4.

In this regard, rather than being formed by a plurality of concave faces that are adjacent to each other (like concave faces 142 of FIG. 2), the side cutting edges 530 of the extractor 510 of FIG. 6 are formed from alternating planar faces 532 and concave faces 534. Lateral sides of each one of the concave faces 534 meet an adjacent planar face 532 at side biting ridges 536. The extractor 510 also has eight total sides (i.e., four planar faces 532 and four concave faces 534. Meanwhile, end cutting edges 540 of the extractor 510 are otherwise similar to those described above in reference to the end cutting edges 150 of FIG. 2. In this regard, the end biting ridges 572 are formed at the apex of adjacent end faces 570 that meet at center point 560. The extractor 510 operates similar to the extractor 110 described above except that there are eight side biting ridges 536 instead of six side biting ridges 144, eight end faces 570 instead of twelve end faces 170, and there are four end biting ridges 572 instead of six end biting ridges 172.

Accordingly, whereas the extractor 110 has greater than 2×N areas of engagement for N number of sides (where N=6), the extractor 510 has N+½N areas of engagement (where N=8). Both the extractor 110 and the extractor 510 have least N+1 areas of engagement over which torque transfer from the extractor 110/510 to the threaded fastener 300 may occur.

Accordingly, a bolt extractor or other threaded fastener extractor of an example embodiment may be provided. The threaded fastener extractor may include a drive end configured to interface with a powered driver where the drive end has a shaft, and an engagement end operably coupled to the drive end coaxial with the drive end about an axis. The engagement end may be configured to engage an extraction hole formed in a threaded fastener. The engagement end may include side cutting edges disposed on lateral sides of the engagement end and end cutting edges disposed at a distal end of the engagement end. The side cutting edges and the end cutting edges each providing engagement areas for torque transfer between the extractor and the threaded fastener.

In some embodiments, the extractor may include additional, optional features, and/or the features described above may be modified or augmented. Some examples of modifications, optional features and augmentations are described below. It should be appreciated that the modifications, optional features and augmentations may each be added alone, or they may be added cumulatively in any desirable combination. In an example embodiment, the side cutting edges may include N number of faces, and a number of the engagement areas may be at least N+1. In an example embodiment, the number of the engagement areas may be 2×N. However, in other embodiments, the number of the engagement areas may be N+½N. In an example embodiment, the side cutting edges may taper toward the distal end at an angle in a range of between about 5 degrees and about 12.5 degrees relative to the axis. In some cases, the side cutting edges may include a plurality of surfaces that meet each other at lateral edges thereof to form side biting ridges. In an example embodiment, a portion of the side biting ridges may be driven into the extraction hole to penetrate sidewalls of the extraction hole. In some cases, the surfaces are each concave surfaces. However, alternatively the surfaces may include concave surfaces separated from each other by planar surfaces. In some cases, the end cutting edges may taper to a center point at an angle in a range of between about 120 degrees and about 150 degrees relative to the axis. In an example embodiment, the center point may be configured to mark an indentation to guide drilling of the extraction hole on the threaded fastener responsive to striking of the center point when the center point is aligned with the axis. In some cases, the end cutting edges may include a plurality of planar end faces that each meet an adjacent end face at an end biting ridge. The end biting ridge may define the angle relative to the axis. In an example embodiment, the drive end may further include a hex head operably coupled to the shaft. In some cases, a number of the end cutting edges may be equal to a number of the side cutting edges. In an example embodiment, a number of the end cutting edges may be less than a number of the side cutting edges. In some cases, the number of the end cutting edges may be half the number of the side cutting edges.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A threaded fastener extractor comprising:

a drive end configured to interface with a powered driver, the drive end having a shaft; and an engagement end operably coupled to the drive end via the shaft and coaxial with the drive end about an axis, the engagement end being configured to engage an extraction hole formed in a threaded fastener;

wherein the engagement end comprises side cutting edges disposed on lateral sides of the engagement end and end cutting edges disposed at a distal end of the engagement end;

wherein the end cutting edges comprise a plurality of planar end faces, wherein each planar end face meets an adjacent planar end face at an end biting ridge, each end biting ridge being linear and intersecting at a center end point disposed on the axis;

wherein side cutting edges comprise a plurality of side biting ridges, wherein each side biting ridge is linear and is radially offset from the end biting ridges relative to the axis;

wherein the side cutting edges and the end cutting edges each provide engagement areas for torque transfer between the extractor and the threaded fastener.

2. The extractor of claim 1, wherein the side cutting edges comprises N number of faces, and wherein a number of the engagement areas is at least N+1.

3. The extractor of claim 2, wherein the number of the engagement areas is 2×N.

4. The extractor of claim 2, wherein the number of the engagement areas is N+½N.

5. The extractor of claim 1, wherein the side cutting edges taper toward the distal end at an angle in a range of between about 5 degrees and about 12.5 degrees relative to the axis.

6. The extractor of claim 5, wherein the side cutting edges comprises a plurality of side surfaces that meet each other at lateral edges thereof to form the side biting ridges.

7. The extractor of claim 6, wherein a portion of the side biting ridges are driven into the extraction hole to penetrate sidewalls of the extraction hole.

8. The extractor of claim 6, wherein the side surfaces are each concave surfaces.

9. The extractor of claim 1, wherein the end cutting edges taper to a center point at an angle in a range of between about 120 degrees and about 150 degrees relative to the axis.

10. The extractor of claim 9, wherein the center point is configured to mark an indentation to guide drilling of the extraction hole on the threaded fastener responsive to striking of the center point when the center point is aligned with the axis.

11. The extractor of claim 1, wherein the drive end further comprises a hex head operably coupled to the shaft.

12. The extractor of claim 1, wherein a number of the end cutting edges is equal to a number of the side cutting edges.

13. The extractor of claim 1, wherein a number of the end cutting edges is less than a number of the side cutting edges.

14. The extractor of claim 13, wherein the number of the end cutting edges is half the number of the side cutting edges.

15. The extractor of claim 1, wherein the side cutting ridges are radially offset from the end biting ridges such that a plane through two opposing end biting ridges and the axis only intersects a linear extension of the side biting ridges at the axis.

16. The extractor of claim 1, wherein each end biting ridge is coplanar with the axis and each side biting ridge is coplanar with the axis.

17. A threaded fastener extractor comprising:

a drive end configured to interface with a powered driver, the drive end having a shaft; and an engagement end operably coupled to the drive end via the shaft and coaxial with the drive end about an axis, the engagement end being configured to engage an extraction hole formed in a threaded fastener;

wherein the engagement end comprises a first set of engagement areas for torque transfer between the extractor and the extraction hole at a first radial distance from the axis and at a first axial location along the engagement ends;

wherein the engagement end comprises a second set of engagement areas for torque transfer between the extractor and the threaded fastener at a second radial distance from the axis and at a second axial location along the engagement end;

wherein the first set of engagement areas comprise linear end biting ridges that intersect at a center end point disposed on the axis;

wherein the second set of engagement areas comprise linear side biting ridges, each linear side biting ridge being radially offset from each of the linear end biting ridges relative to the axis; and wherein the second radial distance is less than the first radial distance and the second axial location is closer to a distal end of the extractor than the first axial location.

18. The extractor of claim 17, wherein the first set of engagement areas taper toward the distal end at an angle in a range of between about 5 degrees and about 12.5 degrees relative to the axis.

19. The extractor of claim 17, wherein the second set of engagement areas taper to a center point at an angle in a range of between about 120 degrees and about 150 degrees relative to the axis.

20. The extractor of claim 17, wherein the first set of engagement areas comprise side cutting edges disposed on lateral sides of the engagement end, and wherein the second set of engagement areas comprise end cutting edges disposed at the distal end of the engagement end.

* * * * *